United States Patent [19]

Baughman

[11] Patent Number: 4,676,101

[45] Date of Patent: Jun. 30, 1987

[54] CAPACITANCE-TYPE MATERIAL LEVEL INDICATOR

[75] Inventor: James S. Baughman, Stanwood, Mich.

[73] Assignee: Walbro Corporation, Cass City, Mich.

[21] Appl. No.: 903,149

[22] Filed: Sep. 3, 1986

[51] Int. Cl.⁴ ............................................. G01F 23/26
[52] U.S. Cl. .................................................... 73/304 C
[58] Field of Search ................... 73/304 C; 324/61 P; 331/65; 340/620; 361/284

[56] References Cited

U.S. PATENT DOCUMENTS

| | | | |
|---|---|---|---|
| 3,199,350 | 8/1965 | Schubring | 73/304 C |
| 3,746,975 | 7/1973 | Maltby | 73/304 C |
| 4,010,650 | 3/1977 | Piatkowski, Jr. | 73/304 C |
| 4,232,300 | 11/1980 | Wright et al. | 73/304 C |
| 4,235,106 | 11/1980 | Maltby et al. | 73/304 C |
| 4,559,507 | 12/1985 | Ramsdale et al. | 73/304 C |

Primary Examiner—Richard R. Stearns
Attorney, Agent, or Firm—Barnes, Kisselle, Raisch, Choate, Whittemore & Hulbert

[57] ABSTRACT

A system for indicating level of material in a vessel as a function of material capacitance comprising a pair of parallel probe electrodes which extend through the vessel and have lower portions disposed beneath the vessel outlet in direct electrical contact with material whose level is to be measured. An electrical signal having both ac and dc components is fed to one of the electrodes, and detected at the other electrode, such that the detected ac signal component varies with both capacitance and conductance of material disposed between the electrodes while the dc signal component varies substantially as a function solely of material conductance. The dc signal component is used to compensate the ac signal component for variations in conductance, so that an output signal is provided which varies as a function of material level between the electrodes substantially independently of material conductance.

16 Claims, 3 Drawing Figures

CAPACITANCE-TYPE MATERIAL LEVEL INDICATOR

The present invention is directed to a system for indicating level of material in a vessel, and more particularly to a material level indicating system responsive to electrical capacitance of material for indicating material level.

BACKGROUND AND OBJECTS OF THE INVENTION

The technology of capacitance-type material level indication has been employed in a number of applications, including measurement and display of fuel level in automotive and other vehicles. In general, systems of this character seek to measure and display material level as a function of the effective capacitance of material between a pair of measurement probes, or between a measurement probe and the vessel wall, which capacitance varies with material level. A general problem in application of such technology to fuel level measurement lies in the fact that many fuels exhibit both electrically conductive and electrically capacitive characteristics. This problem is compounded in vehicles which can employ fuels of differing conductivity. Gasohol containing 10% ethyl alcohol, for example, may possess a conductivity which is ten times that of regular unleaded gasoline. It is desirable to provide a level indicating system which not only compensates for fuel conductivity, but also compensates for differing conductivities in the types of fuels which can be employed.

A general object of the present invention is to provide a system of the described character which is inexpensive in manufacture, and is reliable in operation over a substantial operating lifetime and in a variety of operating environments.

Another and more specific object of the invention is to provide a material level indicating system of the described character which finds particular application in conjunction with electrically conductive materials such as gasoline.

A yet more specific object of the invention is to provide a level indicating system for conductive materials such as gasoline which automatically compensates for material conductivity, and which is adapted to accommodate materials of varying conductivity, such as gasoline containing a varying amounts of alcohol.

SUMMARY OF THE INVENTION

Briefly stated, in accordance with the present invention, a pair of electrically conductive probe electrode elements are positioned in a tank or vessel for containing material whose level is to be measured. An electrical signal having both ac and dc components is fed to a first of the probe electrode elements and transmitted thereby to the second element. The signal received at the second element thus possesses an ac component which varies as a combined function of capacitance and conductance (electrical) of material between the probe electrode elements, and a dc component which varies essentially as a function solely of conductance of material between the electrode elements. Electrical circuitry is responsive to the ac and dc signal components received at the second electrode element for measuring and indicating material level as a combined function of such components.

The probe elements in accordance with the preferred embodiments of the invention comprise a pair of parallel electrodes extending vertically through the vessel to a position beneath the vessel outlet, so that the lower portions of the probe elements are continuously covered by material. A major portion of each probe electrode may be covered by electrical insulating material, so that ac signals transmitted between such electrode portions vary as a combined function of dielectric constant of such insulation and dielectric constant of the contained material. However, at least a lower portion of each electrode is not covered by insulating material, and is in direct electrical contact with material beneath the vessel outlet. The dc signal component is transmitted between the probe electrodes primarily through such uninsulated electrode portions in direct contact with the contained material.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
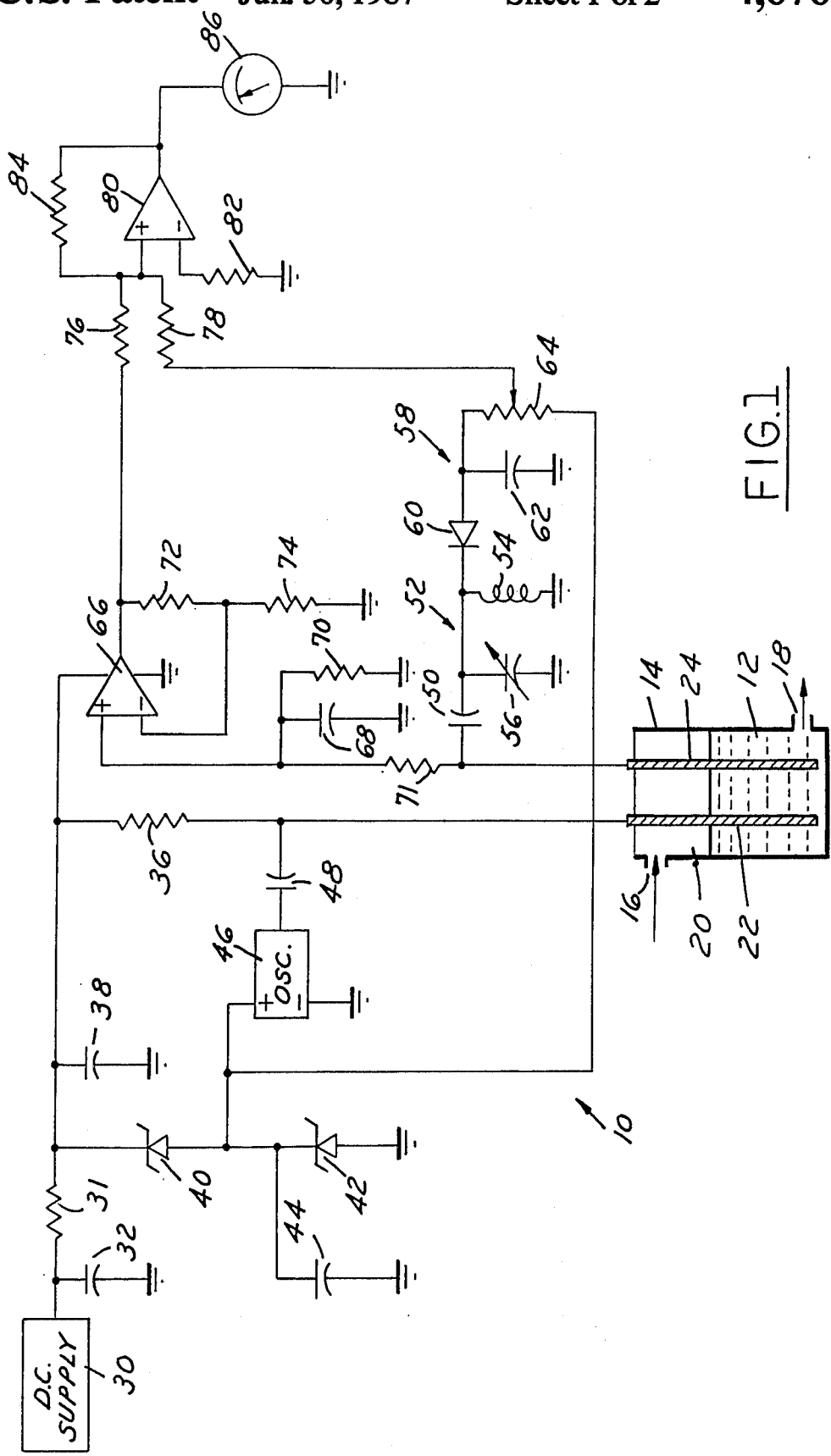
FIG. 1 is an electrical schematic diagram of a material level indicating system in accordance with the presently preferred embodiment of the invention.

FIG. 1 illustrates a presently preferred embodiment 10 of a material level indicating system in accordance with the invention in an application of measuring level of fuel 12 in the fuel tank 14 of an automotive vehicle. Tank 14 includes an inlet 16 and an outlet 18, the latter at the lower portion of tank 14. A capacitance probe 20 comprises a pair of electrically conductive electrodes 22, 24 parallel to each other and extending vertically through tank 14 to a position beneath outlet 18. Electrodes 22, 24 are uncovered and thus in direct electrical contact with fuel 12.

A dc power supply 30, which includes the vehicle battery and/or generator system, has an output connected across a filtering capacitor 32. The output of supply 30 is also connected through current limiting resistors 34, 36 to electrode 22. A second filtering capacitor 38 is connected across the junction of resistors 34, 36, as are a pair of reverse-biased voltage-reducing zener diodes 40, 42. A filtering capacitor 44 is connected across diode 42. An rf oscillator 46 receives power at the junction of diodes 40, 42 and has an output connected through a coupling capacitor 48 to probe electrode 22. Thus, electrode 22 is supplied with a dc signal component from supply 30 through resistors 34, 36, and with an ac signal component from oscillator 46 through capacitor 48.

Probe electrode 24 is connected through a coupling capacitor 50 to an LC resonance circuit 52 which includes an inductor 54 connected in parallel with a capacitor 56. The resonant frequency of circuit 52 is tuned to the output frequency of oscillator 46 by variation of capacitor 56. A rectifier or decoder 58, which includes a diode 60 and a capacitor 62, is connected to resonance circuit 52 to provide a dc signal at a level corresponding to the amplitude of the ac signal component fed to resonance circuit 52 by electrode 24. A variable resistor 64 is connected between rectifier 58 and the power input to oscillator 46, and provides a dc output which thus compensates the output of rectifier 58 for variations in input voltage to oscillator 46.

An operational amplifier 66 has a non-inverting input connected across a filtering capacitor 68 and a resistor 70 to probe electrode 24 through a high-impedance resistor 71. The output of amplifier 66 is connected to the inverting amplifier input through a resistor 72, and thence to ground through a resistor 74. The output of amplifier 66 and the wiper of resistor 64 are connected through respective resistors 76, 78 to a summing junction at the non-inverting input of an operational amplifier 80. The inverting input of amplifier 80 is referenced to ground through a resistor 82, and the amplifier output is coupled to the non-inverting input through a resistor 84. Both amplifiers 66, 80, as well as the remainder of the circuitry, are powered by dc supply 30. The output of amplifier 80 is connected to a dc meter 86 which has a scale calibrated to indicate level of fuel 12 in tank 14.

In operation, ac and dc signal components are fed to probe electrode 22 as previously described, and are transmitted through fuel 12 to electrode 24. The ac signal component received at electrode 24 is rectified at 58, while the dc signal component is blocked by capacitor 50 and amplified at 66. The respective signal components, now both represented by dc signals, are fed to the summing junction at the input of amplifier 80, which provides an output signal as a function of a difference between the ac and dc signal components received at electrode 24. Thus, the dc signal component, which varies as a function of material conductivity, is effectively subtracted from the ac signal component, which varies with both conductivity and capacitance, so that the output of amplifier 80 to meter 86 varies solely with material capacitance, and thus with level of fuel 12 in tank 14.

Figure 2:
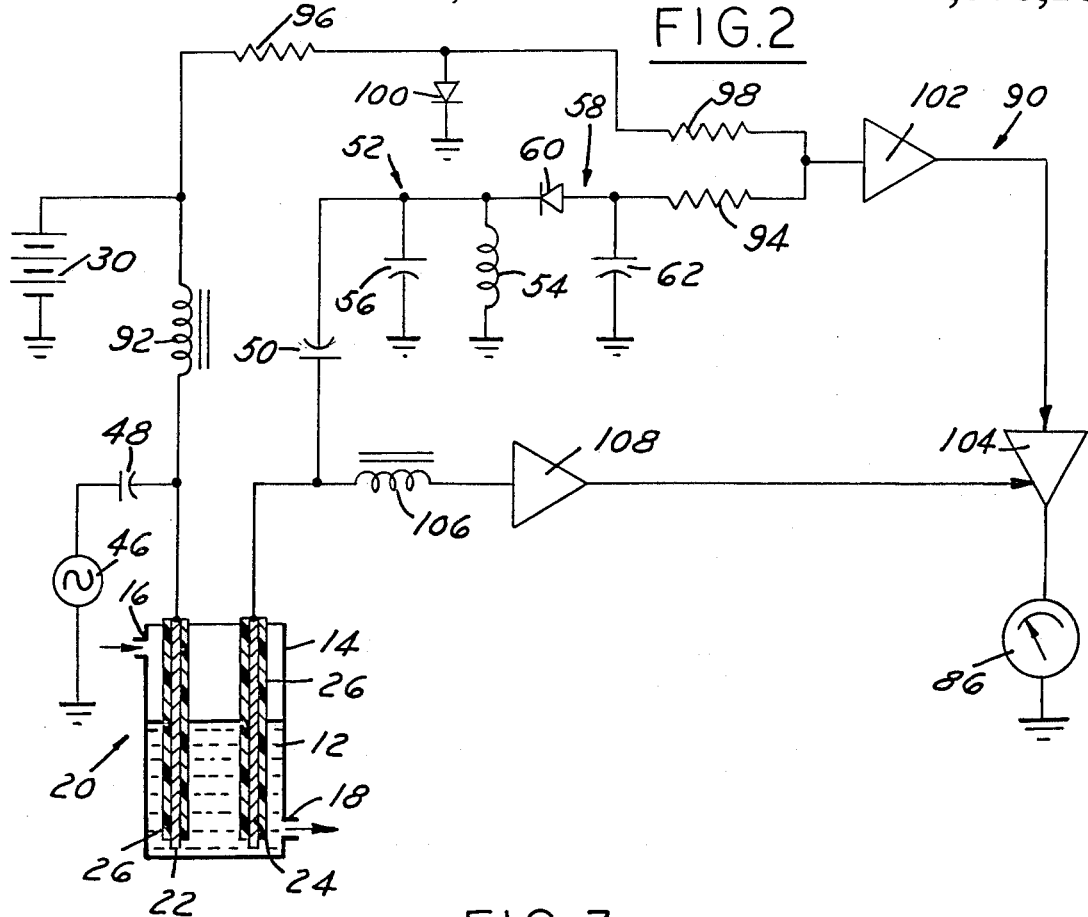
FIGS. 2 and 3 are electrical schematic diagrams of respective alternative embodiments of the invention.
Figure 3:
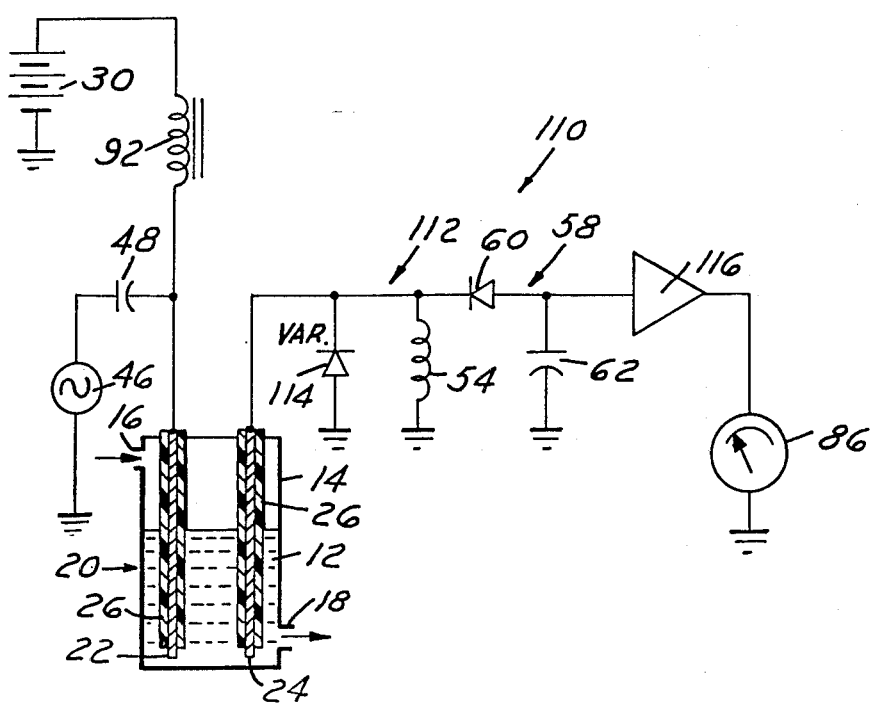

FIGS. 2 and 3 illustrate modifications to the preferred embodiment of FIG. 1. In both FIGS. 2 and 3, components corresponding to those in the preferred embodiment of FIG. 1 are indicated by correspondingly identical reference numerals. Referring to FIG. 2, a major portion of each electrode 22, 24 is covered by insulating material. Only a small portion or section of each electrode beneath outlet 18 is uncovered and in direct electrical contact with fuel 12. Probe electrode 22 receives an ac signal component from oscillator 46 through blocking capacitor 48 and a dc signal component from supply 30 through a choke 92. The ac signal component received at electrode 24 is fed through blocking capacitor 50 and resonance circuit 52 to detector 58 so as to provide a dc signal across capacitor 64 at a level corresponding to the amplitude of such ac component. Such dc signal is fed through a resistor 94 to a summing junction, which receives a second input from supply 30 through the resistors 96, 98. A diode 100 is connected between the junction of resistors 96, 98 and ground, so that the dc signal representative of the ac component at electrode 24 is again compensated for variations in dc supply voltage. The junction of resistors 94, 98 is fed through an amplifier 102 to the input of an AGC amplifier 104. The dc signal component from electrode 24 is fed through a choke 106 and an amplifier 108 to the gain control input of amplifier 104. The output of amplifier 104, which is thus compensated for material conductivity, is fed to level-indicating meter 86.

A second modified embodiment 110 of the present invention is illustrated in FIG. 3. In this embodiment, both the ac and dc signal components at electrode 24 are fed to an LC resonance circuit 112 which comprises inductor 54 in parallel with a varactor 114. The dc signal components at electrode 24 thus varies effective capacitance of varactor 114 so as to detune resonance circuit 112 as a function of material conductivity. Thus, the ac signal component fed to rectifier 58 possesses an amplitude which has been compensated for material conductivity, and the output of rectifier 68 is fed directly to meter 86 through an amplifier 116.

The invention claimed is:

1. A system for indicating level of material in a vessel comprising
   a capacitance probe including first and second probe elements of electrically conductive construction positioned in a vessel such that material in said vessel is disposed therebetween,
   signal transmitting means coupled to said first element and including means for directing an electrical signal having both ac and dc components to said first element, and
   signal receiving means coupled to said second element and responsive to amplitude of both ac and dc signal components received at said second element for indicating level of material in said vessel,
   said signal receiving means including first circuit means responsive to said ac signal component for indicating material level as a function of material capacitance between said elements, and second circuit means responsive to said dc signal component and coupled to said first circuit means for compensating said first circuit means for electrical conductance of material between said elements.

2. The system set forth in claim 1 wherein said signal transmitting means includes an rf signal generator for generating said ac signal component.

3. The system set forth in claim 2 wherein said rf signal generator has a predetermined rf signal frequency, and
   wherein said first circuit means comprises an LC resonance circuit tuned to said rf signal frequency.

4. The system set forth in claim 3 wherein said first circuit means includes means for indicating material level as a function of a difference between said ac and dc signal components.

5. The system set forth in claim 4 wherein said first circuit means comprises a rectifier coupled to said resonance circuit for generating a dc signal as a function of amplitude of said ac component, summing means receiving both said dc component and said dc signal, and means coupled to said summing means for indicating material level.

6. The system set forth in claim 3 wherein said first circuit means includes an amplifier having a signal input responsive to said ac component, a gain control input responsive to said dc component, and an output for indicating material level.

7. The system set forth in claim 3 wherein said second circuit means includes means responsive to said dc component for varying resonant frequency of said resonance circuit.

8. The system set forth in claim 7 wherein said first circuit means comprises a varactor diode.

9. The system set forth in claim 2 wherein said vessel has an outlet, and wherein said first and second probe elements are positioned in said vessel such that lower portions of said elements are disposed beneath said outlet and continuously covered by material.

10. The system set forth in claim 2 wherein each of said first and second probe elements includes a first portion covered with insulating material and a second portion in direct contact with material in said vessel.

11. A system for indicating level of material in a vessel as a function of material capacitance comprising a probe having electrically conductive probe electrode means spaced from each other within a vessel, means coupled to a first of said electrode means for transmitting an electrical signal having both ac and dc components, means coupled to a second of said electrode means for receiving a signal having both said ac and dc components, said ac component at said second electrode means varying as a combined function of capacitance and conductance of material between said probe electrode means, and said dc component at said second electrode means varying substantially as a function solely of conductance of material between said probe electrode means, and means coupled to said receiving means for indicating level of material between said probe electrode means as a combined function of said ac and dc components received at said second electrode means.

12. The system set forth in claim 11 wherein said first and second electrode means comprise a pair of parallel electrodes extending from an upper portion to a lower portion of said vessel.

13. The system set forth in claim 12 wherein said vessel has a material outlet, and wherein a portion of each said electrode means in direct electrical contact with material is positioned beneath said outlet.

14. The system set forth in claim 13 wherein said portion of each said electrode means is in direct electrical contact with material in said vessel, and the remainder of each said electrode means is covered with electrical insulating material.

15. The system set forth in claim 11 wherein said means coupled to said first electrode means comprises an rf signal generator for generating said ac signal component.

16. The system set forth in claim 15 further comprising a dc power source for generating said dc signal component, said rf signal generator including means receiving electrical power from said dc power source, and wherein said means for indicating material level includes means coupled to said dc power source for compensating for variations in power level from said source.

* * * * *

UNITED STATES PATENT AND TRADEMARK OFFICE
CERTIFICATE OF CORRECTION

PATENT NO. : 4,676,101

DATED : June 30, 1987

INVENTOR(S) : James S. Baughman

It is certified that error appears in the above—identified patent and that said Letters Patent is hereby corrected as shown below:

Column 2, Lines 47, 59, 55, "34" should be "31".

Column 3, Line 53, "64" should be "62".

Column 4, Line 11, "68" should be "58".

Signed and Sealed this

First Day of December, 1987

Attest:

DONALD J. QUIGG

Attesting Officer

Commissioner of Patents and Trademarks